United States Patent [19]

Nishiyama et al.

[11] Patent Number: 4,731,682
[45] Date of Patent: Mar. 15, 1988

[54] SIGNAL RECORDING AND/OR REPRODUCING SYSTEM HAVING A CASSETTE STORING AND TRANSPORTING ARRANGEMENT THEREIN

[75] Inventors: Hiraku Nishiyama; Hideki Hama, both of Kanagawa; Masashi Takehana, Tokyo; Yoshiaki Suzuki, Kanagawa, all of Japan

[73] Assignee: Sony Corporation, Tokyo, Japan

[21] Appl. No.: 668,327

[22] Filed: Nov. 5, 1984

[30] Foreign Application Priority Data

Nov. 9, 1983 [JP] Japan .............................. 58-210384
Nov. 30, 1983 [JP] Japan .............................. 58-226549
Nov. 30, 1983 [JP] Japan .............................. 58-226548

[51] Int. Cl.$^4$ ............................................ G11B 15/68
[52] U.S. Cl. .................................................... 360/92
[58] Field of Search ........................ 360/92, 61, 79, 71

[56] References Cited

U.S. PATENT DOCUMENTS

| | | | |
|---|---|---|---|
| 3,852,818 | 12/1974 | Pyles | 360/92 |
| 3,964,097 | 6/1976 | Kohayashi et al. | 360/92 |
| 4,164,765 | 8/1979 | Gysling | 360/92 |
| 4,271,440 | 6/1981 | Jenkins et al. | 360/92 |
| 4,319,290 | 3/1982 | Bolick, Jr. et al. | 360/92 |

Primary Examiner—Robert S. Tupper
Assistant Examiner—Melissa J. Kovac
Attorney, Agent, or Firm—Lewis H. Eslinger; Alvin Sinderbrand

[57] ABSTRACT

A signal recording and/or reproducing system having a tape cassette storing and transporting arrangement therein comprises a cassette storing apparatus having a plurality of receiving compartments each provided for storing a tape cassette therein and at least one recording and/or reproducing apparatus used with the tape cassette taken out from the cassette storing apparatus. A housing is provided with a control panel portion on the top or front wall thereof and with an opening through which the tape cassette is inserted therein on the side wall thereof and a cassete loading mechanism is provided in the housing for guiding a tape cassette inserted in the housing through the opening provided therein to a tape driving portion. Cassette transporting apparatus transports the tape cassette taken out from the cassette storing apparatus in order to transfer the same to the recording and/or reproducing apparatus through the opening provided in the housing thereof and to the receiving compartment of the cassette storing apparatus from the recording and/or reproducing apparatus.

6 Claims, 16 Drawing Figures

SIGNAL RECORDING AND/OR REPRODUCING SYSTEM HAVING A CASSETTE STORING AND TRANSPORTING ARRANGEMENT THEREIN

BACKGROUND OF THE INVENTION

1. Field of the Invention

This invention relates generally to a system for recording an information signal on and/or reproducing an information signal from a tape contained in a cassette, which includes a cassette changing arrangement, and more particularly, to a signal recording and/or reproducing system used with a tape cassette transferable between a recording and/or reproducing apparatus and a cassette storing apparatus included therein.

2. Description of the Prior Art

For transmission of information signals, such as video signals, each reproduced from a recorded magnetic tape contained in a tape cassette in a broadcasting station, there has been proposed a signal reproducing system which comprises a cassette storing apparatus for storing a plurality of tape cassettes in receiving compartments each provided for receiving one of the tape cassettes, at least one reproducing apparatus for reproducing the information signal recorded on the tape cassette selectively taken out from the cassette storing apparatus, and a cassette transporting apparatus for taking a selected one of the tape cassettes out of the receiving compartment of the cassette storing apparatus, transferring the selected tape cassette from the cassette storing apparatus to the reproducing apparatus to be loaded thereon for reproduction and also transferring the selected tape cassette from the reproducing apparatus to the cassette storing apparatus to be stored in the receiving compartment thereof.

There has been also proposed on occasion a signal recording system which comprises a cassette storing apparatus and a cassette transportation apparatus both provided in the same manner as those mentioned above and at least one recording apparatus for recording information signals on the tape cassette selectively taken out from the cassette storing apparatus.

In a previously proposed signal recording and/or reproducing system of such a type as mentioned above, the recording and/or reproducing apparatus contains a cassette loading mechanism for guiding a tape cassette inserted into the apparatus to a tape driving portion provided therein and has an opening for cassette insertion formed on a top or front wall of a housing of the apparatus on which a control panel with a plurality of control buttons or the like is provided so that the tape cassette is inserted into the apparatus therethrough, as disclosed in the Japanese unexamined patent publication No. 56-124159.

In the signal recording and/or reproducing system formed with the recording and/or reproducing apparatus having the opening for cassette insertion on the top or front wall of the housing thereof as mentioned above, one end of the cassette transporting apparatus from which the tape cassette is transferred to the recording and/or reproducing apparatus is disposed to face toward the control panel provided on the top or front wall of the housing of the recording and/or reproducing apparatus in order to insert the tape cassette into the recording and/or reproducing apparatus through the opening for cassette insertion formed on the top or front wall of the housing thereof. This results in the disadvantage that the cassette transporting apparatus impedes an operator to operate or handle easily the control panel of the recording and/or reproducing apparatus.

Further, for the signal recording and/or reproducing system comprising the cassette storing apparatus, recording and/or reproducing apparatus and cassette transporting apparatus as mentioned above, it has been proposed to use an electronic controller having a microcomputer containing memory means therein in order to memorize positions where the cassette transporting apparatus should stop to transfer the tape cassette to the recording and/or reproducing apparatus through the opening for cassette insertion and to control the movement and stopping of the cassette transporting apparatus thereby. With use of such an electronic controller, the signal recording and/or reproducing system can be operated efficiently without being provided with any sensor for detecting each position where the cassette transporting apparatus should stop. However, the previously proposed signal recording and/or reproducing system employing the electronic controller as mentioned above to memorize the stopping positions for the cassette transporting apparatus and control the movement and stopping of the cassette transporting apparatus thereby has the problem that it is required to spend much work and time for adjusting the position of the recording and/or reproducing apparatus accurately so that the transfer of the tape cassette to the recording and/or reproducing apparatus from the cassette transporting apparatus is carried out smoothly, when the recording and/or reproducing apparatus is remounted after the removal thereof for maintenance or check. Additionally, in the case where a plurality of recording and/or reproducing apparatus are stacked in a rack for the purpose of effective use of the space, there is another problem that the recording and/or reproducing apparatus are moved by gravity or shocks acting thereon, and therefore, the positions where the cassette transporting apparatus should stop for transferring the tape cassette to the recording and/or reproducing apparatus through the opening for cassette insertion shift little by little with the lapse of time, so that it becomes difficult gradually for the transfer of the tape cassette to the recording and/or reproducing apparatus from the cassette transporting apparatus to be carried out smoothly and, as a result, the entire system may fail to work properly.

OBJECTS AND SUMMARY OF THE INVENTION

Accordingly, it is an object of the present invention to provide an improved signal recording and/or reproducing system having a tape cassette storing and transporting arrangement therein, which avoids the aforementioned shortcomings encountered with the prior art.

Another object of the present invention is to provide a signal recording and reproducing system having a tape cassette storing and transporting arrangement therein, which contains at least one recording and/or reproducing apparatus having an opening for cassette insertion, through which a tape cassette is inserted thereinto, formed on the side wall of its housing which is provided with a control panel on the top or front wall thereof.

A further object of the present invention is to provide a signal recording and/or reproducing system having a tape cassette storing and transporting arrangement therein, which contains at least one recording and/or reproducing apparatus having an opening for cassette insertion formed on the side wall of its housing which is provided with a control panel on the top or front wall thereof and having also a cassette loading mechanism for loading a tape cassette inserted thereinto through the opening for cassette insertion on a tape driving portion provided therein.

A further object of the present invention is to provide a signal recording and/or reproducing system having a tape cassette storing and transporting arrangement therein, which contains at least one recording and/or reproducing apparatus having an opening for cassette insertion formed on the side wall of its housing which is provided with a control panel on the top or front wall thereof, and contains also a cassette transporting apparatus controlled by an electronic controller having a microcomputer therein so as to carry a tape cassette, and to stop automatically and accurately at the positions appropriate for transferring the tape cassette to the recording and/or reproducing apparatus through the opening for cassette insertion even though the appropriate positions shift with the lapse of time.

A still further object of the present invention is to provide a signal recording and/or reproducing system having a tape cassette storing and transporting arrangement therein, which contains at least one recording and/or reproducing apparatus having an opening for cassette insertion formed on the side wall of its housing which is provided with a control panel on the top or front wall thereof, and contains also a cassette storing apparatus which has a plurality of receiving compartments each provided for receiving a tape cassette to store the same therein and is arranged so as to allow the tape cassettes to be placed at random in the vacant receiving compartments.

According to an aspect of the present invention, there is provided a signal recording and/or reproducing system having a tape cassette storing and transporting arrangement therein, which comprises a cassette storing apparatus having a plurality of receiving compartments each provided for receiving a tape cassette to store the same therein, at least one recording and/or reproducing apparatus for recording an information signal on or reproducing an information signal from the tape cassette taken out selectively from the cassette storing apparatus, the recording and/or reproducing apparatus comprising a housing which is provided with a control panel portion on the top or front wall thereof and with an opening for cassette insertion, through which the tape cassette is inserted thereinto, on the side wall thereof and a cassette loading mechanism provided in the housing for guiding and placing the tape cassette inserted in the housing through the opening for cassette insertion to a tape driving portion provided also in the housing, and a cassette transporting apparatus for taking selectively the tape cassette out of the receiving compartment of the cassette storing apparatus, transferring the selected tape cassette from the cassette storing apparatus to the recording and/or reproducing apparatus through the opening for cassette insertion to be loaded thereon and also transferring the selected tape cassette from the recording and/or reproducing apparatus to the cassette storing apparatus to be stored in the compartment thereof.

In an embodiment of recording and/or reproducing system according to the present invention, improved electronic control means including a microcomputer is provided for controlling the cassette transporting apparatus to stop automatically and accurately at the position appropriate for transferring the tape cassette taken out from the cassette storing apparatus to the selected recording and/or reproducing apparatus to be loaded thereon through the opening for cassette insertion thereof.

Further, in the embodiment of recording and/or reproducing system according to the present invention, the cassette storing apparatus is provided with cassette registering means for making the registration of tape cassettes stored in the receiving compartments, so that each tape cassette can be taken out in compliance with request from one of the receiving compartments after being stored at random therein.

The above and other objects, features and advantages of the present invention will become apparent from the following detailed description of the preferred embodiment of the present invention taken in conjunction with the accompanying drawings.

DESCRIPTION OF THE PREFERRED EMBODIMENT

Now, one embodiment of signal recording and/or reproducing system having a tape cassette storing and transporting arrangement therein according to the present invention will be described in detail with reference to the drawings hereinafter.

Figure 1:
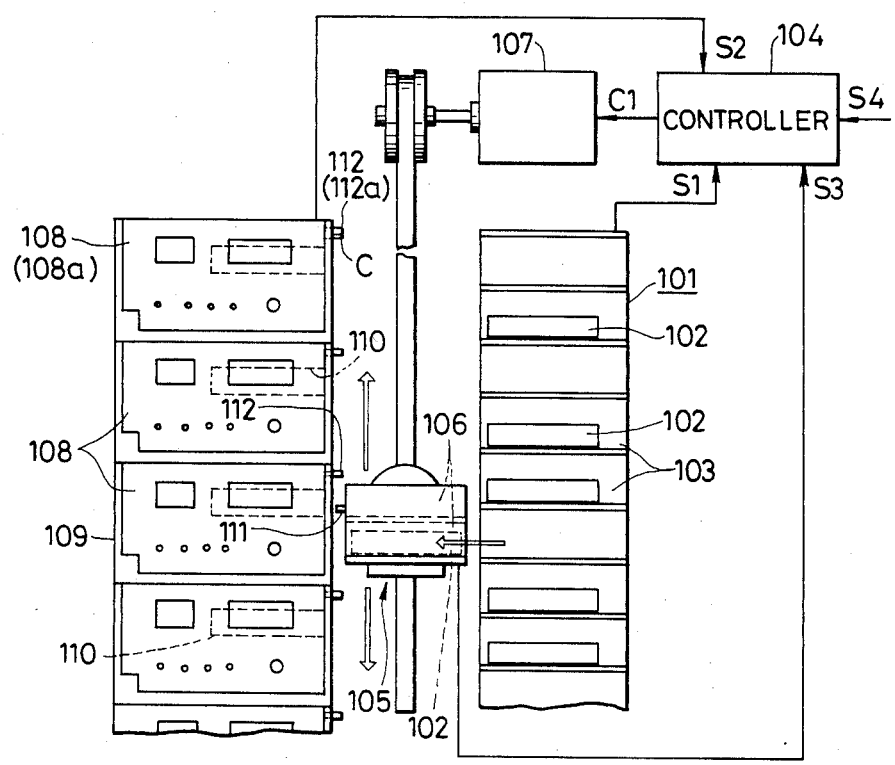
FIG. 1 is a schematic illustration showing one embodiment of signal recording and/or reproducing system according to the present invention.

FIG. 1 shows schematically an example of a signal recording and/or reproducing system having a tape cassette storing and transporting arrangement therein according to the present invention as a whole.

In this example, a cassette storing apparatus 101, a cassette transporting apparatus 105 and a plurality of recording and/or reproducing apparatus 108 are employed. The cassette storing apparatus 101 has a plurality of receiving compartments 103 stacked vertically for receiving tape cassettes 102 to store therein, respectively. From each of the receiving compartments 103, a signal S1 representing whether the tape cassette 102 is stored therein or not is drived and supplied to a controller 104 which will be described later. The cassette transporting apparatus 105 has a carriage 106 for holding and transporting the tape cassette 102 and is driven to go up and down along a predetermined path as indicated by arrows in FIG. 1 by a stepping motor 107 which acts as driving means for the cassette transporting apparatus 105 and rotates selectively in the normal or reverse rotating directions in response to a driving signal C1 supplied from the controller 104.

Further, the recording and/or reproducing apparatus 108 are fixed on a rack 109 so as to be stacked vertically. Each recording and/or reproducing apparatus 108 is provided therein with a cassette receiving portion 110 to which the tape cassette 102 transported by the cassette transporting apparatus 105 is transferred, and a signal S2 representing the condition of use of the tape cassette in each recording and/or reproducing apparatus 108 is derived from a group of the recording and/or reproducing apparatus 108 and supplied to the controller 104. In connection with these recording and/or reproducing apparatus 108, the cassette transporting apparatus 105 is controlled to move to a predetermined position appropriate for transferring the tape cassette to or receiving the tape cassette from the selected one of the recording and/or reproducing apparatus 108 and to stop thereat.

Figure 2:
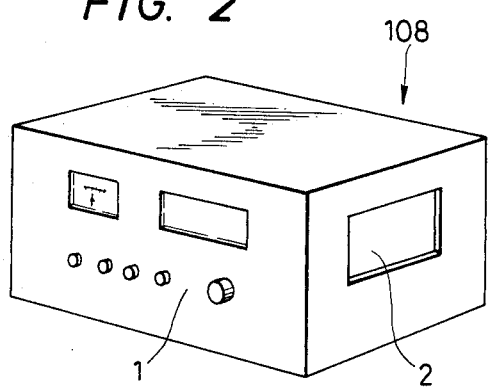
FIG. 2 is a schematic perspective view showing the exterior of an example of a recording and/or reproducing apparatus employed in the embodiment shown in FIG. 1.
Figure 3:
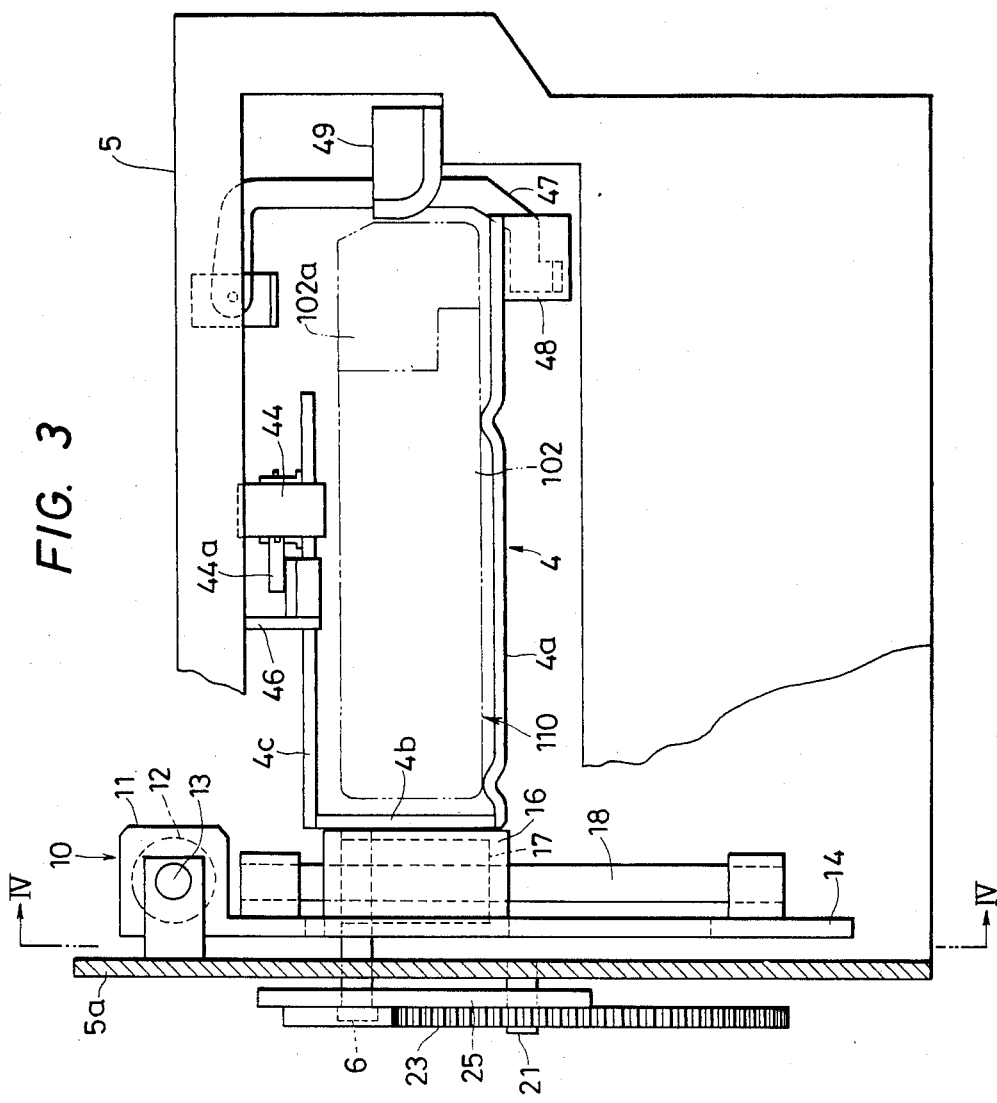
FIG. 3 is a front view showing the inside configuration of the example shown in FIG. 2.
Figure 4:
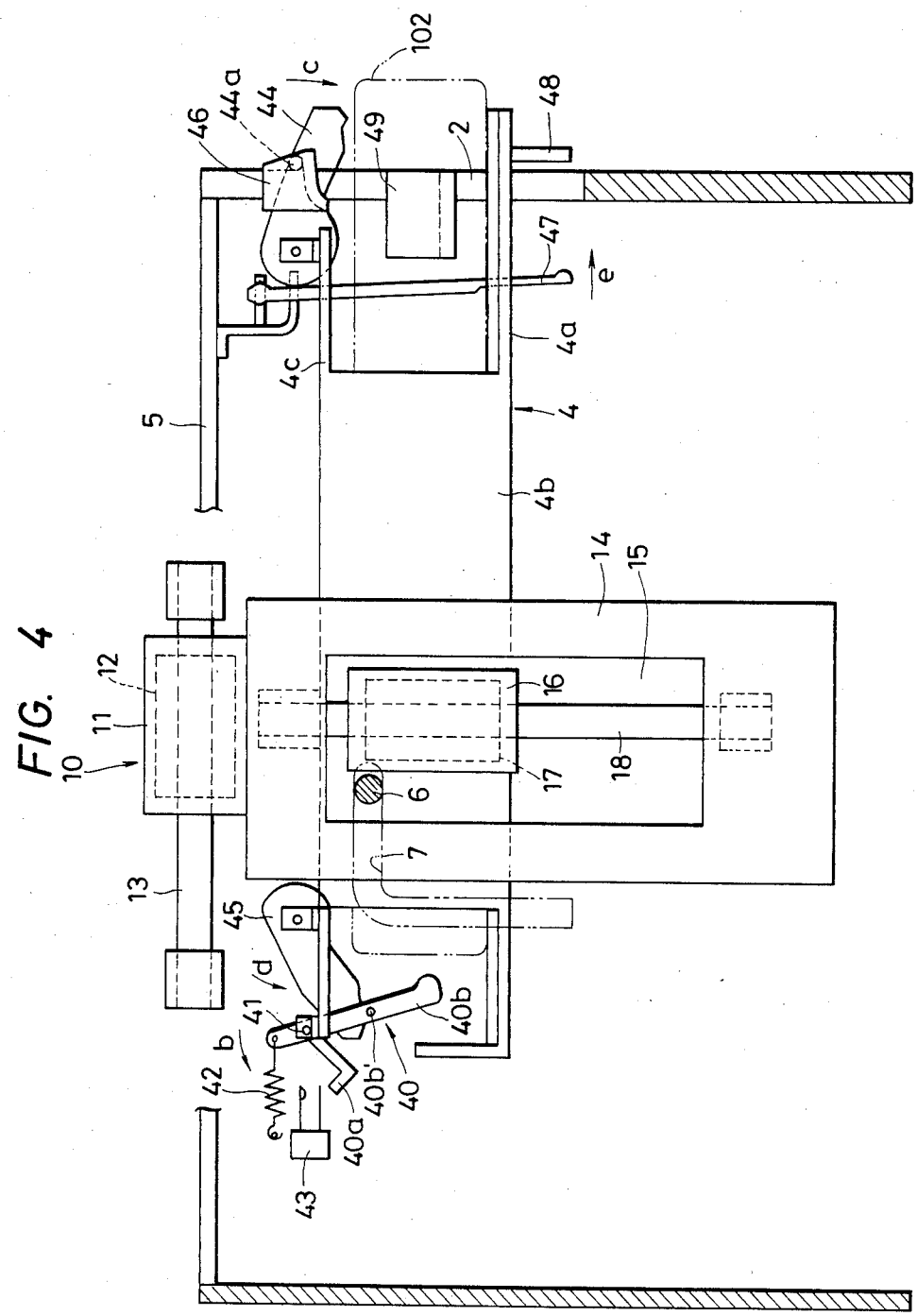
FIG. 4 is a sectional view along the line IV—IV in FIG. 3.
Figure 5:
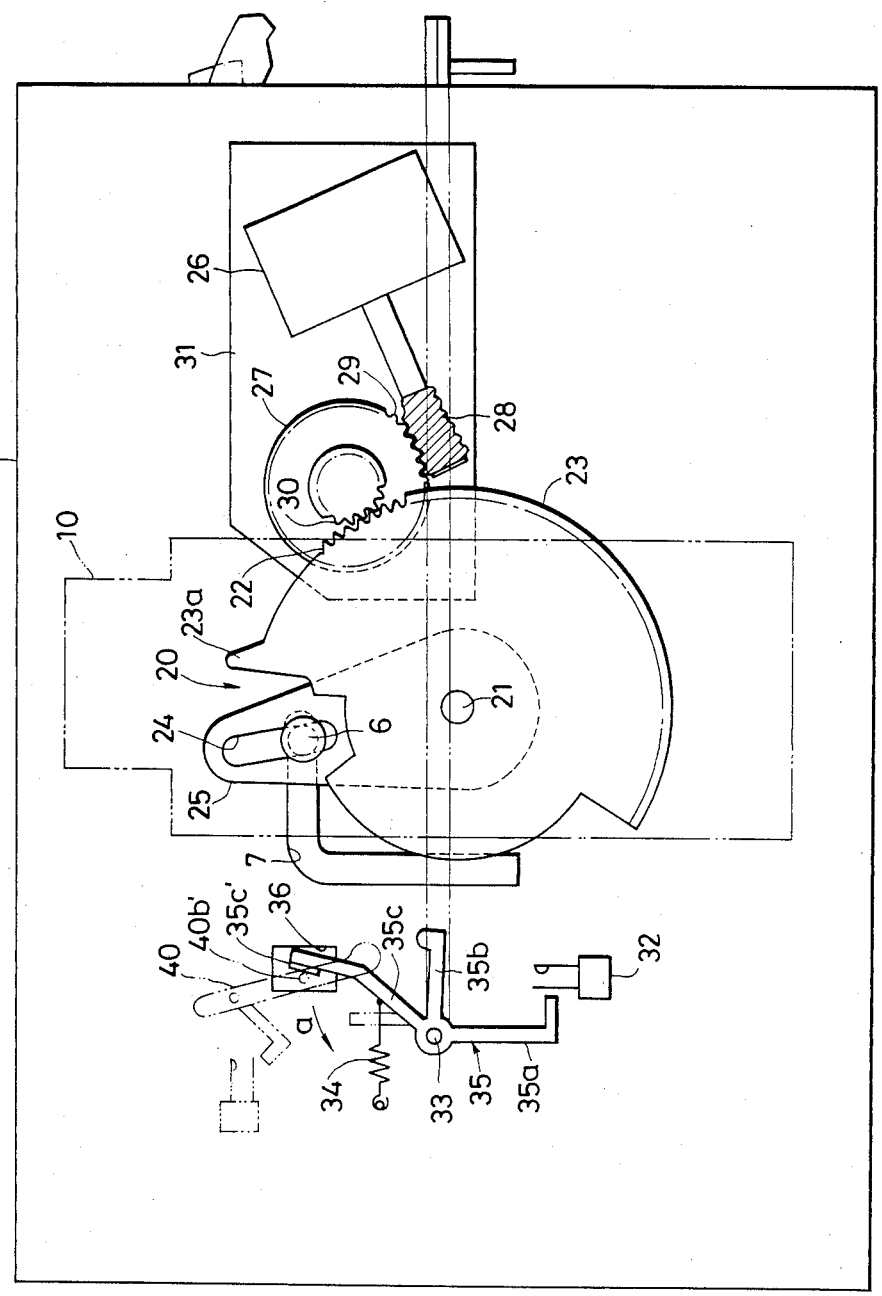
FIG. 5 is a side view showing the inside configuration of the example shown in FIG. 2.

FIG. 2 shows the exterior of the recording and/or reproducing apparatus 108 and FIGS. 3, 4 and 5 show schematically and partially the inside configuration of the recording and/or reproducing apparatus 108, respectively.

As shown in FIG. 2, the recording and/or reproducing apparatus 108 has its housing provided with a control panel 1, on which main control buttons or knobs are mounted, on the front wall thereof. The housing of the recording and/or reproducing apparatus 108 is also provided with an opening 2 for cassette insertion on the side wall thereof, so that the tape cassette 102 is inserted through the opening 2 into the cassette receiving portion 110 provided in the housing.

Then, the inside configuration including the cassette receiving portion 110 of the recording and/or reproducing apparatus 108 will be described with reference to FIGS. 3 to 5.

In the housing of the recording and/or reproducing apparatus 108, a chassis 5 is provided and a cassette chamber 4 for receiving the tape cassette 102 inserted through the opening 2 into the housing and carrying the same to the tape driving portion (not shown in FIGS.) is disposed in the chassis 5. The cassette chamber 4 is formed with a bottom plate 4a, side plate 4b and top plate 4c and can move together with a moving block 10 which is attached thereto. The moving block 10 is operative to cause the cassette chamber 4 to move smoothly in both horizontal and vertical directions and has a sliding member 11 sliding with the movement of the cassette chamber 4 in the horizontal direction. The sliding member 11 has therein a slide bearing 12 which moves along a shaft 13 secured to a side wall 5a of the chassis 5 to elongate horizontally. A plate member 14 is expanded from the sliding member 11 and provided with a rectangular hole 15 in which a sliding member 16 is placed so as to slide with the movement of the cassette chamber 4 in the vertical direction. The sliding member 16 has therein a slide bearing 17 which moves along a shaft 18 secured to the plate member 14 to elongate vertically. The sliding member 16 contained in the moving block 10 thus constituted is fixed on the side plate 4b of the cassette chamber 4 so as to move with the movement of the cassette chamber 4.

The tape cassette 102 is inserted into the cassette chamber 4 in such a manner that the long side portion of the tape cassette 102 where a lid (guard panel) 102a is provided for covering an opening from which a tape is drawn out is advanced along the direction of insertion as shown in FIG. 3, that is, the tape cassette 102 is inserted with one of the short side portions at the front and the other of the short side portions at the rear.

On the side plate 4b of the cassette chamber 4, a pin 6 is fixed to project through a guide slot 7 shaped as an L on the side wall 5a of the chassis 5 to the outside of the side wall 5a. The cassette chamber 4 is moved horizontally and vertically when the pin 6 is driven to move along the guide slot 7 by a driving portion explained hereinafter.

The driving portion for moving the pin 6 fixed on the side plate 4b of the cassette chamber 4, that is, for driving the cassette chamber 4, the main mechanism of which is disposed at the outside of the side wall 5a of the chassis 5, will be explained with reference to FIG. 5. As shown in FIG. 5, a rotatable arm 20 is mounted to a supporting post 21 projected from the side wall 5a of the chassis 5. The rotatable arm 20 has a first portion 23 provided with a gear 22 at a part of the periphery thereof and a second portion 25 provided with a long hole 24. The pin 6 projected from the side wall 5a of the chassis 5 is inserted into the long hole 24 formed in the rotatable arm 20, so that the cassette chamber 4 is driven through the pin 6 by the rotation of the rotatable arm 20.

A motor 26 is provided for rotating the rotatable arm 20 and in this example the rotatable arm 20 is rotated through a gear 27 by the motor 26. The driving force of the motor 26 is transferred to the rotatable arm 20 through a gear 29 engaging with a worm gear 28 fixed on the shaft of the motor 26 and the gear 27 having a tooth portion 30 engaging with the gear 22 provided to the rotatable arm 20. The motor 26 and the gear 27 are disposed in a cutout portion 31 formed on the side wall 5a of the chassis 5.

For controlling the motor 26, switches 32 and 43 shown in FIGS. 5 and 4 respectively are provided on the outer surface of the side wall 5a of the chassis 5. The switch 32 is manipulated by a lever 35 pivoted on a axis 33 and forced by a spring 34 in the direction indicated by an arrow a. The lever 35 has three arms 35a, 35b and 35c, and the arm 35a engages with the switch 32 to manipulate the same. The arm 35b is pressed by a projection 23a provided on the first portion 23 of the rotatable arm 20, and the arm 35c is provided at the end thereof with a engaging portion 35c' which projects through a rectangular opening 36 formed on the side wall 5a of the chassis 5 toward the inside of the chassis 5 to engage with a lever 40 described in detail later. The driving portion mentioned above forms a cassette loading mechanism in cooperation with the cassette chamber 4 in this example, and the main mechanism of this driving portion which contains, for example, the rotatable arm 20, the guide slot 7 and so on is disposed at a location on the side opposite to the long side portion on which the lid 102a is provided for covering the opening from which the tape is drawn out, in other words, at a location close to the side wall 5a of the chassis 5.

The lever 40 is pivoted on an axis 41 provided on the top plate 4c of the cassette chamber 4 with its two arms 40a and 40b and forced by the spring 42 in the direction indicated by an arrow b, as shown in FIG. 4. The arm 40a is operative to manipulate the switch 43 provided for detecting the condition in which the tape cassette 102 is fully inserted into the cassette chamber 4, and the motor 26 is caused to enter into operation when the switch 43 is made on. The arm 40b is operative to push the tape cassette 102 toward the opening 2 for cassette insertion when the tape cassette 102 is unloaded and taken out to the outside. Further, the arm 40b is provided with a boss 40b' which engages with the engaging portion 35c' provided on the arm 35c of the lever 35 to limit the rotation of the lever 35, as shown in FIG. 5.

On the top plate 4c of the cassette chamber 4, a couple of cassette holding members 44 and 45 are provided at positions corresponding to the front and rear ends of the tape cassette 102 which is fully inserted into the cassette chamber 4, respectively, for engaging with the front and rear ends of the tape cassette 102 so as to fix the same in the cassette chamber 4. The cassette holding member 44 is pivoted to be rotatable and forced in the direction indicated by an arrow c shown in FIG. 4, and is kept in such a condition as shown in FIG. 4 with a boss 44a getting on an engaging portion 46 provided on the chassis 5 when the cassette chamber 4 is set in the condition as shown in FIG. 4. The cassette holding member 45 is pivoted to be rotatable and forced in the direction indicated by an arrow d shown in FIG. 4, and is kept in such a condition as shown in FIG. 4 by an engaging member not shown in the figures when the cassette chamber 4 is set in the condition as shown in FIG. 4.

On the bottom plate 4a of the cassette chamber 4, a couple of circular openings are provided at positions corresponding to supply and take-up reels in the tape cassette 102, respectively, though they are not shown in the figures. The supply and take-up reels in the tape cassette 102 are caused to engage with reel driving devices which are provided under the bottom plate 4a of the cassette chamber 4 with engaging portions projecting therefrom toward the tape cassette 102 through the circular openings formed on the bottom plate 4a of the cassette chamber 4, respectively. For opening the lid 102a of the tape cassette 102 when the tape cassette 102 is loaded on the tape driving portion as aforementioned, a lever 47 is attached to the chassis 5. The lever 47 is held to be loose-jointed for the purpose of avoiding damage and forced a little in the direction indicated by an arrow e shown in FIG. 4, and a position limiting plate 48 is fixed to the bottom plate 4a of the cassette chamber 4 for keeping the lever 47 vertical when the lid 102a of the tape cassette 102 is made open. In the inside of the chassis 5, a guide member 49 is provided at a location close to the opening 2 for cassette insertion of the tape cassette 102 for guiding the tape cassette 102 when the tape cassette 102 is inserted into the cassette chamber 4 with its short side portions at the front and the rear, respectively.

Figure 6:
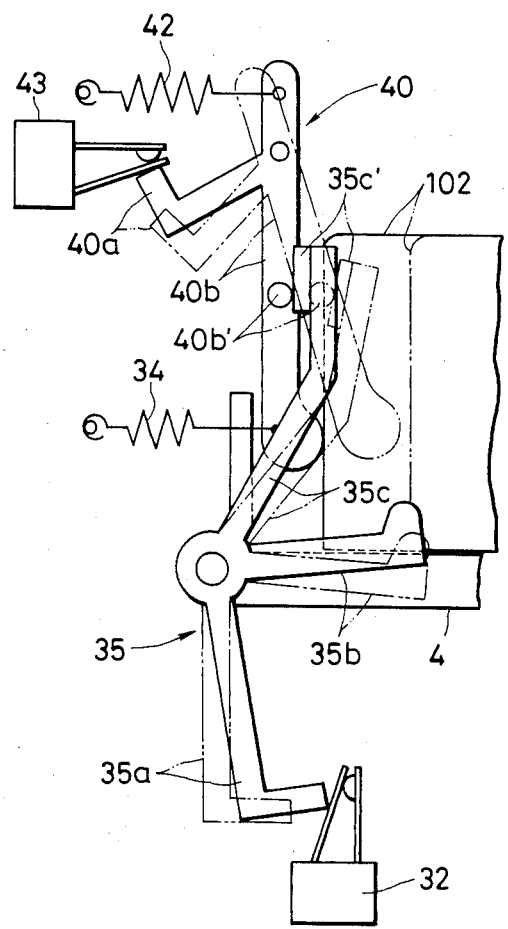
FIGS. 6 and 7 are illustrations used for explanation of the operation of the example shown in FIG. 2.

In the recording and/or reproducing apparatus 108 thus constituted according to the present invention, when the tape cassette 102 is fully inserted through the opening 2 for cassette insertion into the cassette chamber 4, the arm 40b of the lever 40 is pressed by the front short side portion of the tape cassette 102 to move into the position shown by a solid line from the position shown by a dot and dash line in FIG. 6 against the force by the spring 42. As a result of this, the switch 43 is turned on by the arm 40a of the lever 40, so that it is detected that the tape cassette 102 is fully inserted into the cassette chamber 4. Further, the lever 35 which has been restricted to rotate by the lever 40 moves into the position shown by a solid line from the position shown by a dot and dash line in FIG. 6, and as a result of this, the switch 32 is turned on by the arm 35a of the lever 35, so that the motor 26 is caused to start rotating.

Figure 7:
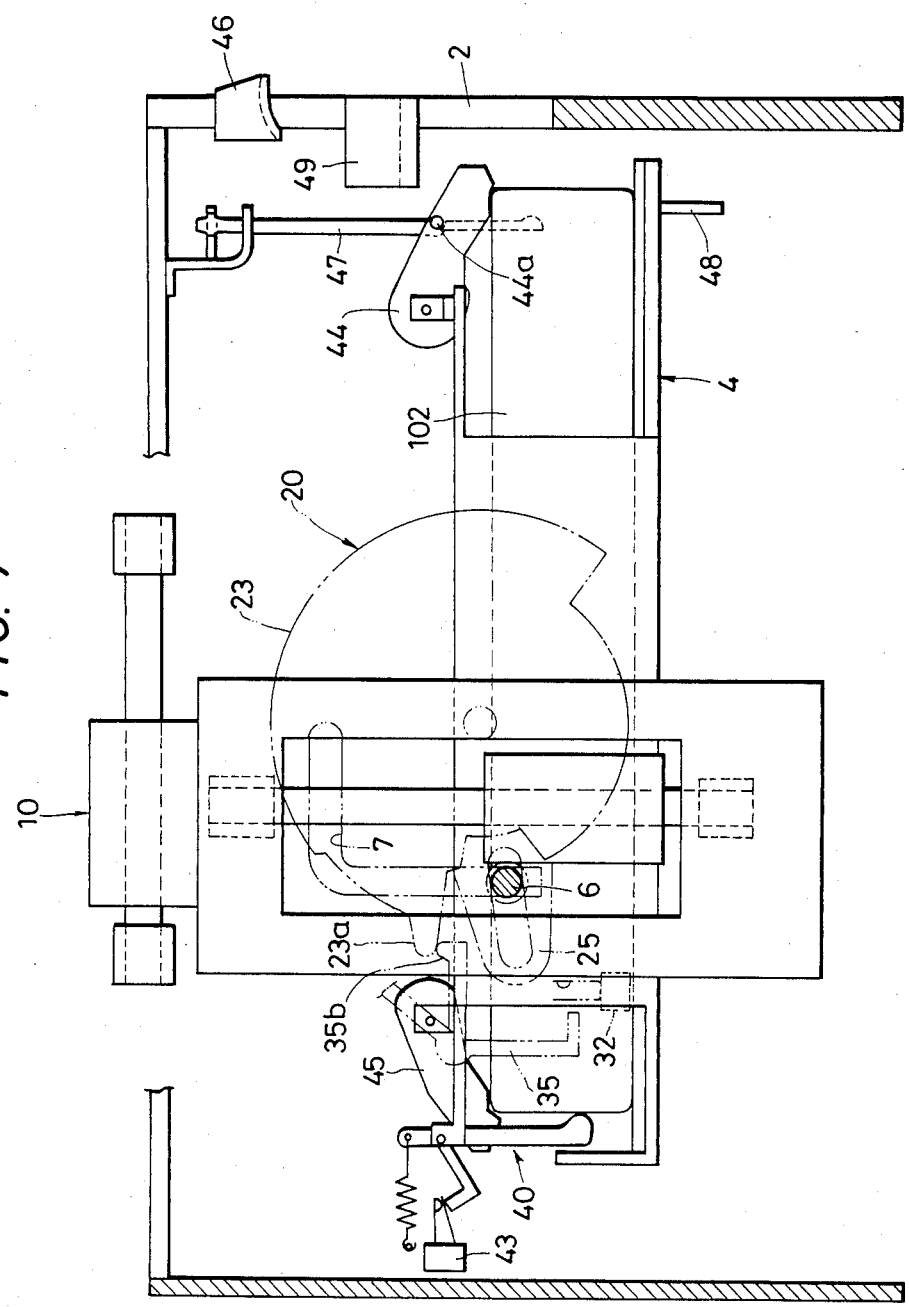

Then, the driving force of the motor 26 is transferred through the gear 27 to the rotatable arm 20 and therefore the rotatable arm 20 is rotated to the right in FIG. 5. Consequently, the pin 6 engaging with the long hole 24 formed on the rotatable arm 20 is moved along a horizontal portion of the guide slot 7, so that the cassette chamber 4 is moved to the left in FIG. 4 together with the entire moving block 10. On this occasion, as shown in FIG. 7, the cassette holding member 44 comes to engage with the rear end of the tape cassette 102 with the boss 44a thereof removed from the engaging portion 46. The cassette holding member 45 has already engaged with the front end of the tape cassette 102 when the tape cassette 102 is fully inserted into the cassette chamber 4. Accordingly, the tape cassette 102 is fixed in the cassette chamber 4 by the cassette holding members 44 and 45, as shown in FIG. 7. Incidentally, the engaging portion 35c' provided on the arm 35c of the lever 35 touches the inside surface of the side wall 5a of the chassis 5 on which the opening 36 is formed so as to be restricted to rotate thereby. Further, the switch 43 is moved with the movement of the cassette chamber 4.

The pin 6 moved horizontally along the horizontal portion of the guide slot 7 is further moved along a vertical portion of the guide slot 7, so that the cassette chamber 4 is moved downward in FIG. 4 together with the entire moving block 10. Then, as shown by a dot and dash line in FIG. 7, the arm 35b of the lever 35 is pressed by the projection 23a provided on the first portion 23 of the rotatable arm 20 and therefore the lever 35 is rotated to the right in FIG. 7. As a result of this, the switch 32 is turned off to stop the motor 26 from rotating, so that the cassette chamber 4 is caused to stop moving and to take the condition shown in FIG. 7. In this situation, the supplying and taking up reels in the tape cassette 102 are loaded on the reel driving devices to engage with the engaging portions of the latter projecting toward the tape cassette 102 through the circular openings which are formed on the bottom plate 4a of the cassette chamber 4, respectively. After that, the lid 102a of the tape cassette 102 is lifted up to be open by the lever 47 which is kept vertical by the position limiting plate 48 so that the loading of the magnetic tape contained in the tape cassette 102 is able to be carried out.

Next, the cassette unloading operation performed for removing the tape cassette 102 from the tape driving portion and returning the same toward the opening 2 for cassette insertion will be explained hereinafter.

In case of the cassette unloading operation, first, the motor 26 is caused to start rotating regardless of the condition of the switch 32 to rotate the worm gear 28 in the direction opposite to the rotating direction in the cassette loading operation aforementioned and therefore the rotatable arm 20 is rotated to the right in FIG. 7. With such rotation of the rotatable arm 20, the pin 6 is moved along the guide slit 7 in the direction opposite to the moving direction in the cassette loading operation aforementioned, and consequently, the cassette chamber 4 is moved along the path reverse to the moving path in the cassette loading operation aforementioned, so that the tape cassette 102 is removed from the tape driving portion. Then, the lever 40 is rotated by the force of restitution of the spring 42 to return to the position shown by the dot and dash line from the position shown by the solid line in FIG. 6 when the boss 44a of the cassette holding member 44 gets on the engaging portion 46 and therefore the rear end of the tape cassette 102 is released from the cassette holding member 44. Accordingly, the tape cassette 102 is pushed by the arm 40a of the lever 40 at the rear short end thereof toward the opening 2 for cassette insertion and the switch 43 is turned off.

Simultaneously, the lever 35 returns also to the position shown by the dot and dash line from the position shown by the solid line in FIG. 6. As a result of this, the switch 32 is turned off to stop the motor 26 from rotating and the cassette chamber 4 is stopped to get back to the position as shown in FIG. 3.

As apparent from the description aforementioned, the recording and/or reproducing apparatus 108 mentioned above is provided with the opening 2 for cassette insertion on the side wall of its housing which has the front wall on which the control panel 1 is provided. Accordingly, in the aforementioned example of the signal recording and/or reproducing system according to the present invention, the cassette transporting apparatus 105 can be located so as to have one end thereof, from which the tape cassette 102 is transferred to the recording and/or reproducing apparatus 108, disposed close to the side wall of the housing of the recording and/or reproducing apparatus 108 without impeding an operator to operate or handle easily the control panel thereof.

Further, in the aforementioned example of the signal recording and/or reproducing system according to the present invention, the path for transporting the tape cassette 102 by the cassette transporting apparatus 105 between the cassette storing apparatus 101 and the recording and/or reproducing apparatus 108 can be made linear because the cassette transporting apparatus 105 can be located as mentioned above. This results in the advantage that the entire system can be simplified in configuration and miniaturized.

Figure 8:
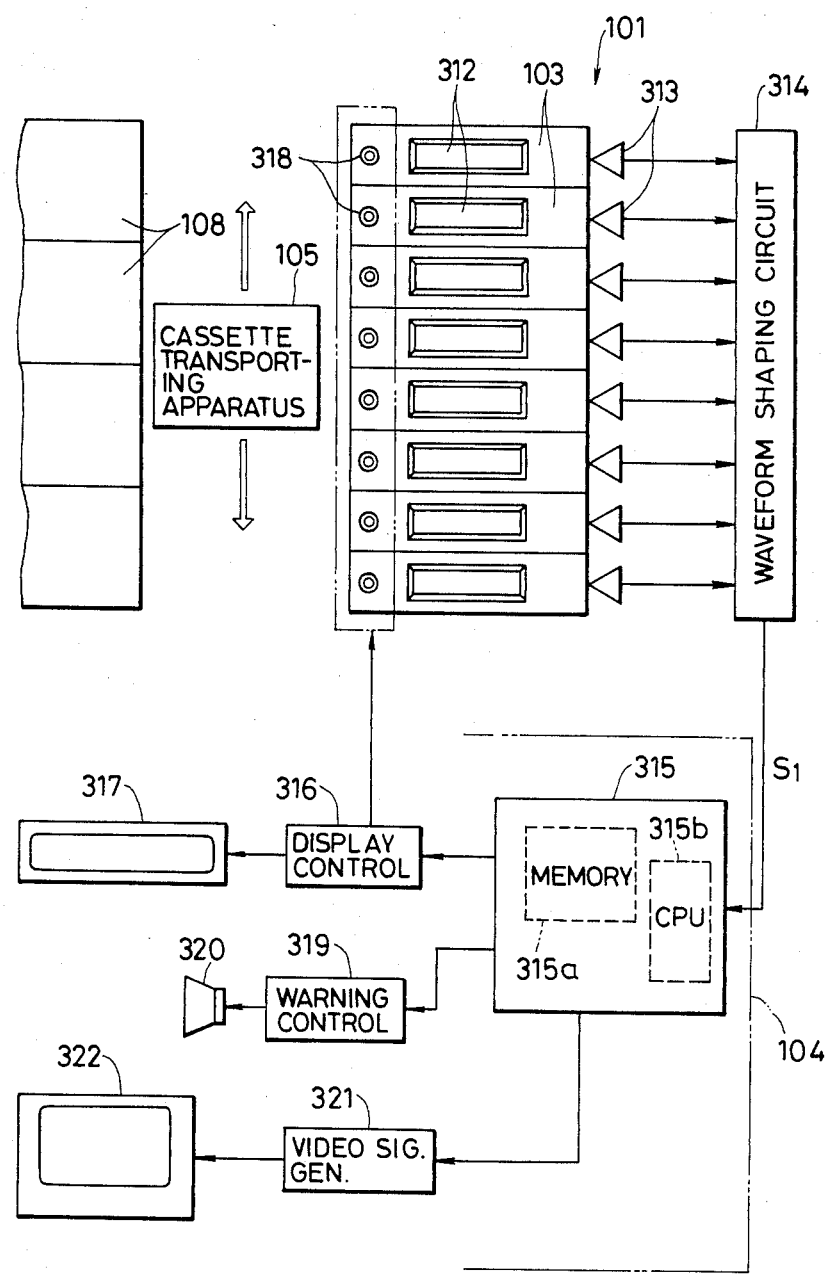
FIG. 8 is a schematic illustration showing an example of a cassette storing apparatus employed in the embodiment shown in FIG. 1.

FIG. 8 shows one example of the cassette storing apparatus 101 employed in the embodiment of the present invention shown in FIG. 1. In this example, a plurality of receiving compartments 103 stacked vertically are provided for receiving and storing the tape cassettes 102 therein, respectively. Each receiving compartment 103 has an opening 312 through which the tape cassette 102 is inserted therein and is provided with a sensor 313 for performing the optical detecting operation to producing a detecting signal varying in response to the existence of the tape cassette 102 therein. The output terminal of each of the sensors 313 is connected to the input terminal of a waveform shaping circuit 314 which produces a signal S1 at the output terminal thereof in response to the detecting signals from the sensors 313. The signal S1 is supplied to a cassette registering portion 315 provided in the controller 104. The cassette registering portion 315 comprises a microcomputer containing a memory 315a, central processing unit (CPU) 315b and an interface portion as main components.

The first output terminal of the cassette registering portion 315 is connected to the input terminal of a display control circuit 316. One of the output terminals of the display control circuit 316 is connected to the input terminal of a cassette display device 317 which displays the information representing each tape cassette 102 and the other of the output terminals of the display control circuit 316 is connected to pilot lamps 318, one of which is provided for each of the receiving compartment 103. Each pilot lamp 318 brightens in, for example, red or blue in accordance with the signal supplied from the display control circuit 316. The second output terminal of the cassette registering portion 315 is connected to the input terminal of a warning control circuit 319 and the output terminal of the warning control circuit 319 is connected to a speaker 320. The third output terminal of the cassette registering portion 315 is connected to the input terminal of a video signal generating circuit 321 and the output terminal of the video signal generating circuit 321 is connected to a picture display device 322 using a cathode ray tube for displaying.

With the construction as described above, the detecting signals from the sensor 313 are supplied to the waveform shaping circuit 314 and the signal S1 which is shaped in its waveform so as to take a high level when the tape cassette 102 is in the receiving compartment 103 and a low level when the tape cassette is not in the receiving compartment 103, is supplied to the cassette registering portion 315. The cassette registering portion 315 makes the judgment of the existence or otherwise of the tape cassette 102 in each of the receiving compartments 103 repeatedly and detects the insertion of the tape cassette 102 into the receiving compartment 103 or the removal of the tape cassette 102 from the receiving compartment 103.

Further, the cassette registering portion 315 is operative also to supply the information representing the tape cassette 102 which is to be inserted into the receiving compartment 103, through the display control circuit 316, to the cassette display device 317. With such information representing the tape cassette 102 which is to be inserted into the receiving compartment 103, the cassette display device 317 makes such a display as the number: [A B C D 1 2 3 4] representing a specific one of the tape cassettes 102, for example. When an operator inserts the tape cassette 102 having the number: [A B C D 1 2 3 4] into one of the receiving compartments 103 through the opening 312 thereof in accordance with the display on the cassette display device 317, the existence of the tape cassette 102 in the receiving compartment 103 into which the tape cassette 102 is newly inserted is detected. Then, the information including a portion representing the receiving compartment 103 into which the tape cassette 102 is newly inserted, for example, the number: [5] and another portion of the number: [A B C D 1 2 3 4] representing the tape cassettes 102 inserted into the receiving compartment 103 having the number: [5] is memorized on the memory 315a, so that the registration of one of the tape cassettes 102 in the cassette registering portion 315 is completed. The information thus memorized is sent through the video signal generating circuit 321 to the picture display device 322 and the contents thereof is displayed on the cathode ray tube of the picture display device 322.

As a result of this, it is clarified that the tape cassette 102 having the number: [A B C D 1 2 3 4] is stored in the receiving compartment having the number : [5]. Further, when the tape cassette 102 has been registered in the manner mentioned above, the cassette registering portion 315 causes the pilot lamp 318 which corresponds to the receiving compartment 103 storing the registered tape cassette 102 to change to red from blue, for example, for indicating the registration of the tape cassette 102.

In the case where the registered tape cassette 102 is taken out through the operater's fault from the receiving compartment 103 or another tape cassette 102 is inserted into the receiving compartment 103 from which the registered tape cassette 102 has been taken out to be transported to the recording and/or reproducing apparatus 108 by the cassette transporting apparatus 105 and which is temporarily vacant, trouble may result. Accordingly, in this example, a warning is conducted through the warning control circuit 319 and the speaker 320 in the case mentioned above to call attention to returning the tape cassette 102 inserted by mistake or to removing the tape cassette 102 taken out by mistake.

Figure 9A:
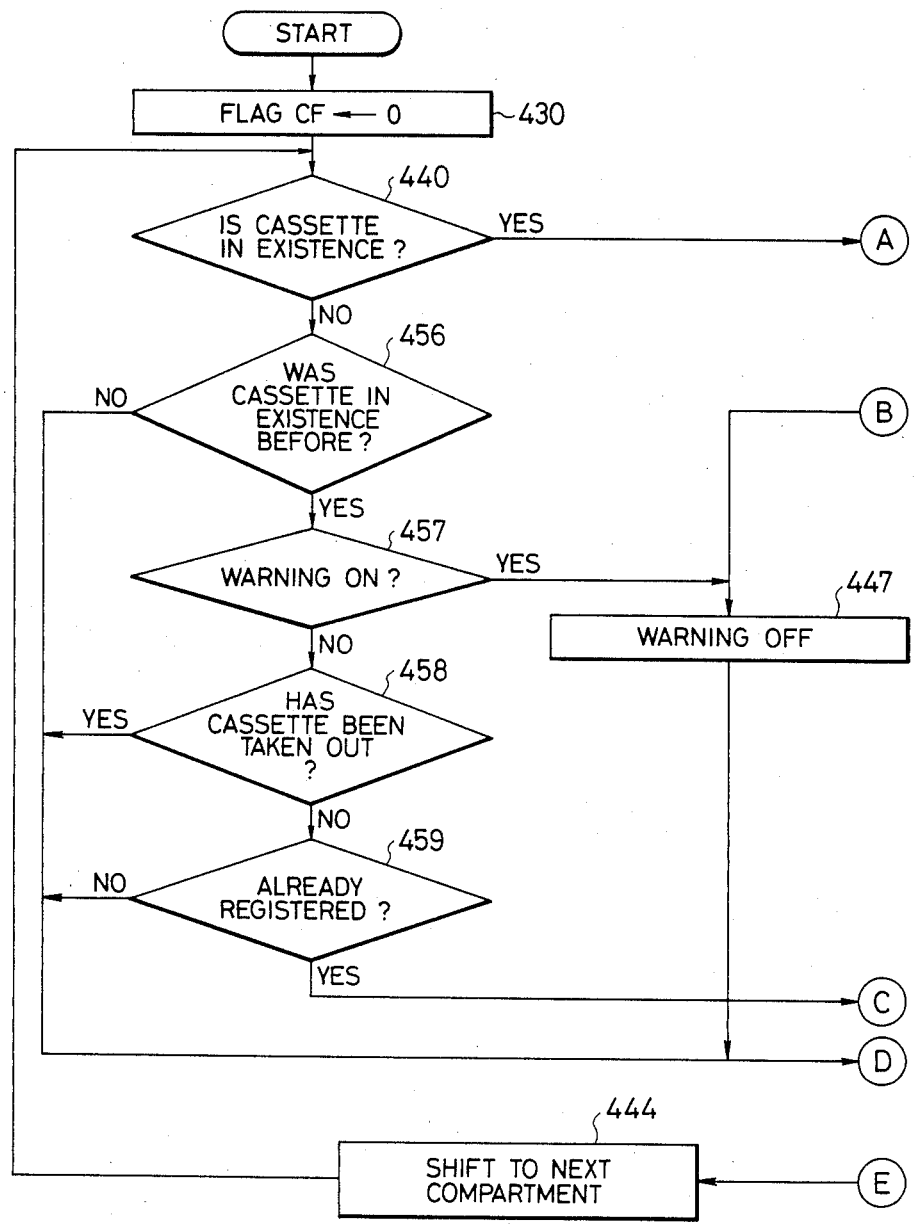
FIG. 9 is a flow chart used for explaining of the operation of the example show in FIG. 8.
Figure 9B:
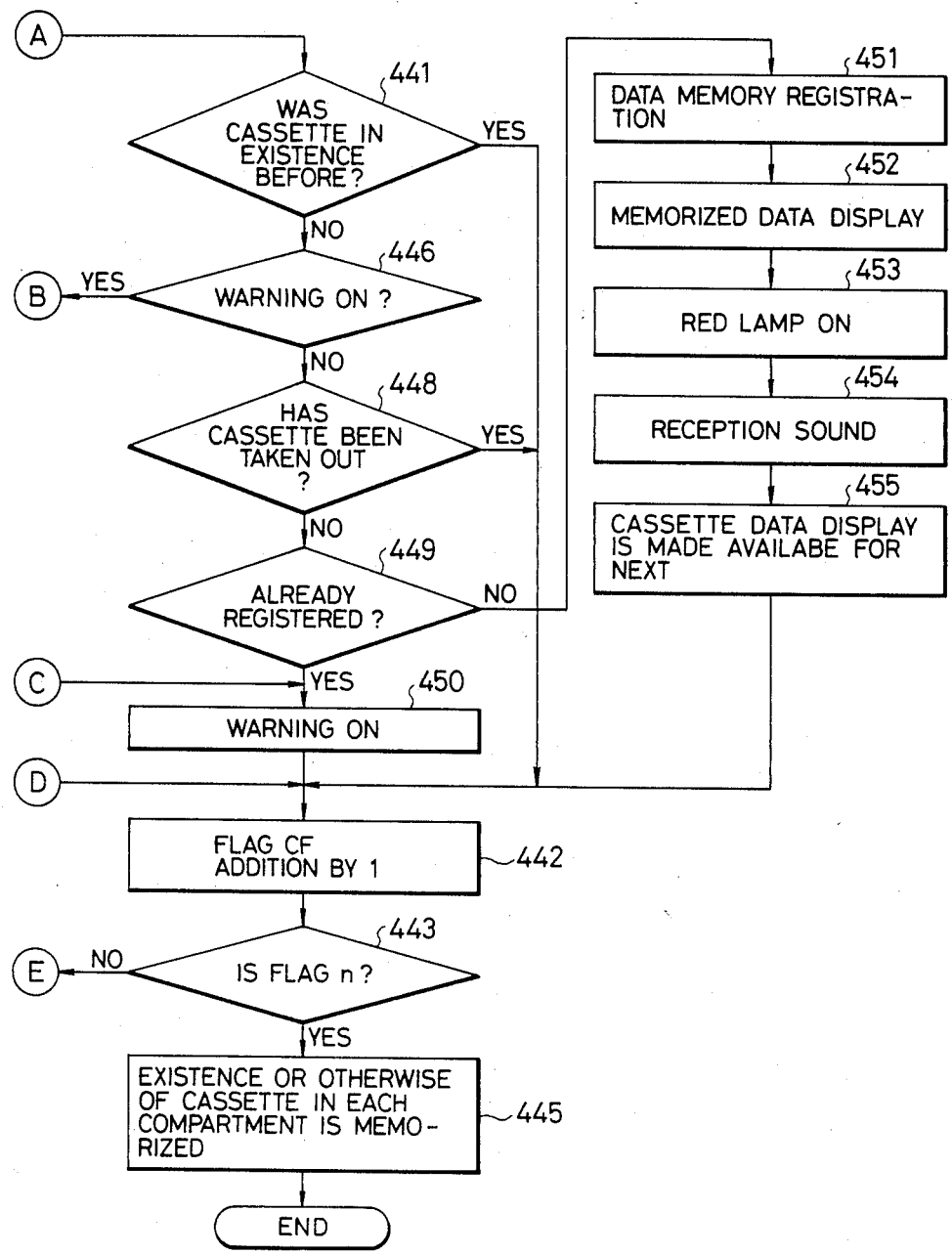

The aforementioned sequential work in the cassette registering portion 315 is carried out in accordance with the operation of the CPU 315b contained in the cassette registering portion 315, and one example of the program functioning in the CPU 315b will be described with reference to the flow chart shown in FIG. 9 hereinafter.

Assume that the first to n th receiving compartments 103 are stacked in order and, for each tape cassette 102 which is to be inserted into one of the receiving compartments 103, the information representing such tape cassette 102 is displayed on the cassette display device 317 whenever the tape cassette 102 is inserted into the corresponding receiving compartments 103.

After starting, in process 430, a flag CF representing the number of times as mentioned below is made to be zero. Then, in decision 440, it is determined whether or not a tape cassette 102 is in the first receiving compartment 103 on the strength of the detecting signal from the sensor 313. If the tape cassette 102 exists in the first receiving compartment 103, it is further determined, in decision 441, whether or not the tape cassette 102 was existent in the first receiving compartment 103 on the last occasion on the strength of the data memorized on the last occasion in process 445 described later. In this decision, if the data have not been memorized, the result of the check in the decision 440 is used for past data. If it is determined that the tape cassette 102 was existent in the first receiving compartment 103 as a result of the check in the decision 441, the step is advanced to process 442 because the tape cassette 102 existent in the first receiving compartment 103 has not been newly inserted.

On the other hand, if it is determined that the tape cassette 102 was not existent in the first receiving compartment 103 as a result of the determination in decision 441, it is concluded that the tape cassette 102 existent in the first receiving compartment 103 has been inserted newly. Then, in decision 446, it is determined whether or not the warning is on. In the case where the warning is on, it is concluded that the tape cassette 102 was once taken out through the operator's fault from the first receiving compartment 103 after the registration of the tape cassette 102 and then returned in an instant to the first receiving compartment 103 by the operater owing to the warning. Accordingly, if the warning is on as a result of the check in the decision 446, the warning is turned off in process 447 and the step is advanced to process 442. On the contrary, if the warning is off as a result of the check in the decision 446, it is further determined whether or not the tape cassette 102 has been inserted into the first receiving compartment 103 by the cassette transporting apparatus 105, in decision 448, that is, it is determined whether or not the cassette transporting apparatus 105 returned the tape cassette 102 taken out from the recording and/or reproducing apparatus 108 into the first receiving compartment 103. If the tape cassette 102 has been inserted by the cassette transporting apparatus 105, the step is advanced to the process 442 because the tape cassette 102 existent in the first receiving compartment 103 is not one displayed on the cassette display device 317 and is to be newly inserted. For the check conducted in the decision 448, it is to be detected by appropriate detecting means that the cassette transporting apparatus 105 inserted the tape cassette 102 into the first receiving compartment 103.

If it is clarified that the tape cassette 102 has not been inserted by the cassette transporting apparatus 105 as a result of the check in the decision 448, the step is advanced to decision 449 because the tape cassette 102 displayed on the cassette display device 317 has been inserted into the first receiving compartment 103 through the opening 312 for cassette insertion thereof by the operater. In the decision 449, it is determined whether or not the tape cassette 102 existent in the first receiving compartment 103 has already been registered. If it is clarified that the registration of the tape cassette 102 has already been done as a result of the check in the decision 449, the step is advanced to process 450 because the tape cassette 102 displayed on the cassette display device 317 has been inserted into the first receiving compartment 103 from which the registered tape cassette 102 was taken out to be transferred to the recording and/or reproducing apparatus 108 and which was temporarily vacant. In the process 450, the warning is made on in order to call attention to removing the tape cassette 102 from the first receiving compartment 103.

If it is clarified that the registration of the tape cassette 102 has not already been done as a result of the check in the decision 449, the step is advanced to process 451 because the tape cassette 102 displayed on the cassette display device 317 has been inserted into the first receiving compartment 103. In the process 451, the information representing the tape cassette 102 displayed on the cassette display device 317 and the first receiving compartment 103 is memorized on the memory 315a, so that the registration of the tape cassette 102 in the first receiving compartment 103 is completed.

Next, in process 452, the information memorized in memory 315a is supplied to the video signal generating circuit 321 and the contents of the information supplied to the video signal generating circuit 321 is displayed on the picture display device 322. Then, in process 453, the pilot lamp 318 corrsponding to the first receiving compartment 103 is changed to red from blue. Further, in process 454, a short reception sound is produced by the speaker 320. Then, in process 455, the information displayed on the cassette display device 317 is changed to represent the next tape cassette 102, and the step is advanced to process 442.

On the other hand, if the tape cassette 102 is not existent in the decision 440, it is determined whether or not the tape cassette 102 was existent in the first receiving compartment 103 on the last occasion, in the same manner as the check in the decision 441, in decision 456. As a result, if it is clarified that the tape cassette 102 was not existent in the first receiving compartment 103, the step is advanced to process 442 because the situation has not been changed. On the contrary, it is clarified that the tape cassette 102 was existent in the first receiving compartment 103 as a result of the check in the decision 456, the step is advanced to decision 457 because the tape cassette 102 has been taken out immediately before from the first receiving compartment 103 by the operater or the cassette transporting apparatus 105. In the decision 457, it is determined whether or not the warning is on. In the case where the warning is on, it is concluded that the tape cassette 102 was once inserted through the operater's fault into the first receiving compartment 103 from which the registered tape cassette 102 had been taken out to be transferred to the recording and/or reproducing apparatus 108 and which had been vacant and then taken out in an instant to the first receiving compartment 103 by the operater owing to the warning. Accordingly, if the warning is on as a result of the check in the decision 457, the warning is turned off in the process 447 and the step is advanced to process 442.

On the contrary, if the warning is off as a result of the check in the decision 457, it is further determined whether or not the tape cassette 102 has been taken out from the first receiving compartment 103 by the cassette transporting apparatus 105, in decision 458. If the tape cassette 102 has been taken out by the cassette transporting apparatus 105, the step is advanced to the process 442 because the tape cassette 102 registered at the first receiving compartment 103 has been transferred to the recording and/or reproducing apparatus 108.

If it is clarified that the tape cassette 102 has not been taken out by the cassette transporting apparatus 105 as a result of the check in the decision 458, the step is advanced to decision 459 because the tape cassette 102 has been taken out from the first receiving compartment 103 by the operater. In the decision 459, it is determined whether or not the registration of the tape cassette 102 has been already done at the first receiving compartment 103. If it is clarified that the registration of the tape cassette 102 at the first receiving compartment 103 has not already been done at the first receiving compartment 103 as a result of the check in the decision 459, the step is advanced to the process 442 because the tape cassette 102 which has to be taken out, for example, the tape cassette 102 released from the registration, has been taken out.

If it is clarified that the registration of the tape cassette 102 at the first receiving compartment 103 has already been done as a result of the check in the decision 459, the step is advanced to process 450 because the registered tape cassette 102 has been taken out through the operater's fault from the first receiving compartment 103. In the process 450, the warning is made on and the display of the first receiving compartment 103 and the tape cassette 102 registered at the first receiving compartment 103 is turned on and off in order to call attention to the need to return the registered tape cassette 102 taken out through the operater's fault. Then the step is advanced to the process 442.

In the process 442, the flag CF is increased by 1, and it is determined whether or not the flag CF is equal to n (n is the number of the receiving compartments 103) in decision 443. If the flag CF is not equal to n, the step is returned to the decision 440 via step 444 in order to check the existence of the tape cassette 102 in the next receiving compartment 103. After that, the aforementioned steps are taken repeatedly so that the existence of the tape cassette 102 in each of the first to n th receiving compartments 103 is checked successively. On the other hand, if the flag CF is equal to n as a result of the check in the decision 443, the step is advanced to process 445 because the check for the whole of the first to n th receiving compartments 103 has been completed. In the process 445, the result of the check concerning the existence of the tape cassette 102 in each of the first to n th receiving compartments 103 in the decision 440 is memorized on the memory 315a, and the operation is finished.

As apparent from the above, in this example of the cassette storing apparatus 101, when a specific tape cassette displayed on the cassette display device 317 is inserted into one of the receiving compartments 103, the information representing the specific tape cassette and the receiving compartment 103 in which the specific tape cassette is stored therein is memorized, and therefore the information concerning the existence of each tape cassette in one of the receiving compartments 103 is renewed whenever a new tape cassette is inserted into the receiving compartment 103. This results in the advantage that a required one of the tape cassettes 102 stored in the receiving compartments 103 can be taken out from the corresponding receiving compartment 103 surely and quite easily with the relatively simple configuration.

As shown in FIG. 1, the cassette transporting apparatus 105 is provided with a photosensor 111 at its side portion facing to the recording and/or reproducing apparatus 108, which is constituted by apparatus including a shutter 112 attached to the rack 109 at the position corresponding to each recording and/or reproducing apparatus 108. The photosensor 111 forms in cooperation with the shutters 112 a position detecting sensor for detecting the position of the cassette transporting apparatus 105 in relation to positions where the cassette transporting apparatus 105 should stop to transfer the tape cassette 102 to the recording and/or reproducing apparatus 108.

Figure 10:
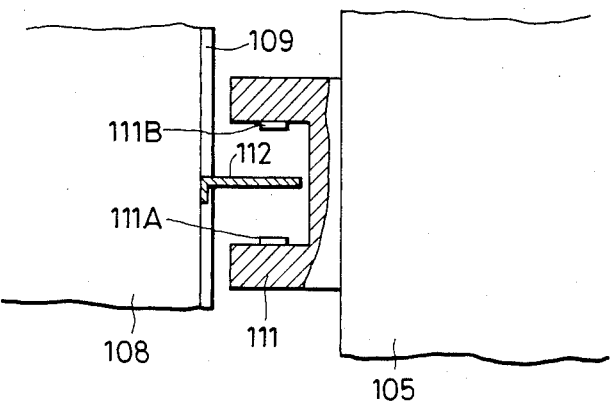
FIGS. 10 and 11 are partial enlarged sectional views each showing a positional sensor used for example in a cassette transporting apparatus employed in the embodiment shown in FIG. 1.
Figure 11:
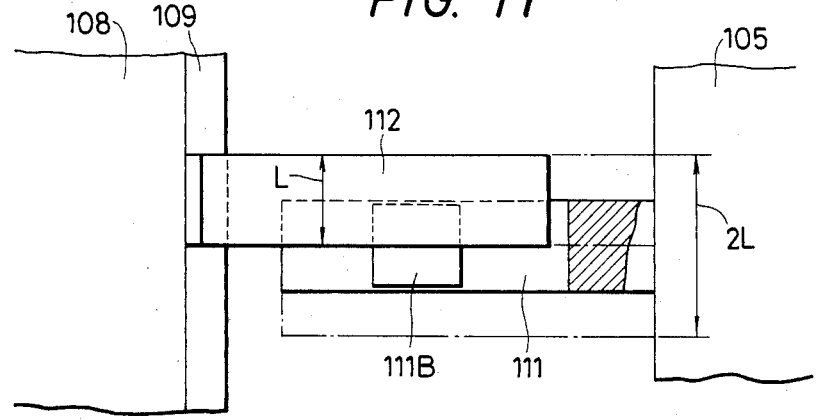

The photosensor 111 is formed in the shape of ⊐ with a square luminescent element 111A and a square photodetecting element 111B facing each other, as shown in enlarged scale in FIGS. 10 and 11, and supplies a detecting signal S3 obtained in response to the amount of light received by the photodetecting element 111B to a transport control portion 114 contained in the controller 104. The shutter 112 is formed in the shape of a plate and disposed in such a manner that, for example, the lower end of the shutter 112 is in a plane located at the center of the space between the luminescent element 111A and the photodetecting element 111B when the cassette transporting apparatus 105 stays at the position appropriate to stop, as shown with a solid line in FIG. 11. The width L of the shutter 112 is so selected that the upper end of the photodetecting element 111B is always placed within the vertical width 2L with its center at the location corresponding to the lower end of the shutter 112, as shown with a dot and dash line in FIG. 11, when the cassette transporting apparatus 105 is moved to the position for stopping and stops thereat. The position of the cassette transporting apparatus 105 in relation to the position appropriate for stopping measured from a reference position C which corresponds to the lower end of the shutter 112 (112a) attached at the position corresponding to the recording and/or reproducing apparatus 108 (108a) disposed at the top of the rack 109, is detected by the photosensor 111, and the detecting signal S3 is supplied to the transport control portion 114 in the controller 104.

Figure 12:
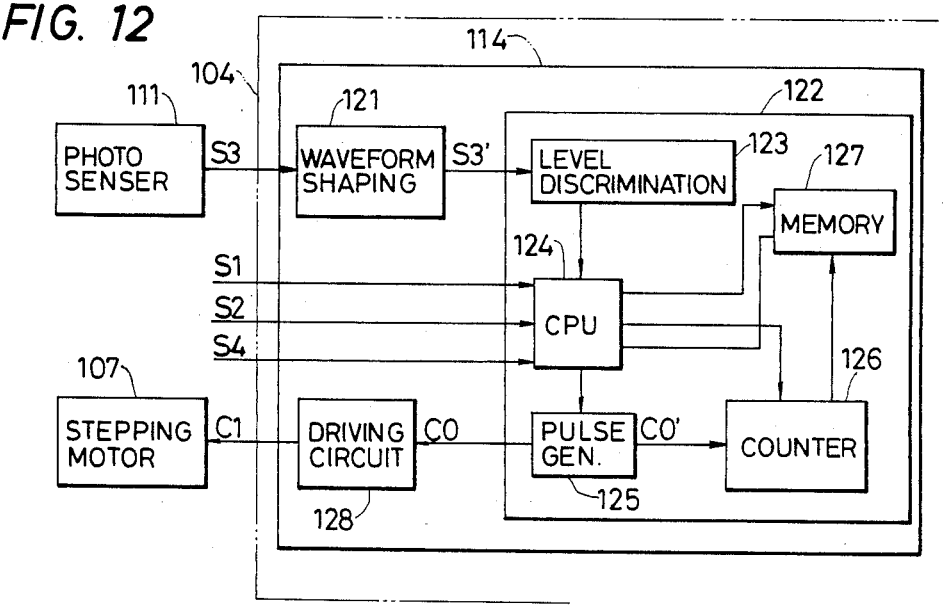
FIG. 12 is a block diagram used for explanation of controlling means for the cassette transporting apparatus employed in the embodiment shown in FIG. 1.

FIG. 12 shows an example of the configuration of the transport control portion 114 and the connections between the photosensor 111, the stepping motor 107 and the transport control portion 114. In this example, the detecting signal S3 from the/photosensor 111 is supplied to a waveform shaping circuit 121 and is shaped in waveform therein to become a signal S3' taking a high level when the amount of light received by the photodetecting element 111B is equal to or more than a half of the maximum amount of light which the photodetecting element 111B can receive and a low level when the amount of light received by the photodetecting element 111B is less than a half of the maximum amount of light. The signal S3' thus obtained is supplied to a microcomputer 122.

The microcomputer 122 comprises a level discrimination circuit 123 for discriminating the high level or low level of the signal S3' supplied from the waveform shaping circuit 121, a CPU 124 which is supplied with the output of the level discrimination circuit 123, the signal S1 from the cassette storing apparatus 101, the signal S2 from the recording and/or reproducing apparatus 108, and a signal S4 designating the recording and/or reproducing apparatus 108 to which the tape cassette 102 is to be transferred, and operative to perform necessary operation and control, a pulse generating circuit 125 which is controlled by the CPU 124 and generates positive or negative pulses CO for driving the stepping motor 107, a counter 126 conducting the up/down counting in response to the polarity of a signal CO' which corresponds to the pulses CO and is supplied thereto from the pulse generating circuit 125 under the control by the CPU 124, and a memory 127 for memorizing the count data obtained from the counter 126 and supplying the memorized count data to the CPU 124 under the control by the CPU 124. The pulses CO generated by the pulse generating circuit 125 are amplified by a driving circuit 128 to become the driving signal Cl supplied to the stepping motor 107. The stepping motor 107 rotates with the number of stepping movements made in response to the number of the pulses CO and in the direction determined in response to the polarity of the pulses CO and therefore the cassette transporting apparatus 105 is moved upward or downward.

With the construction described above, the operation for transporting the tape cassette 102 from the cassette storing apparatus 101 to designated recording and/or reproducing apparatus 108 and vice versa is performed automatically in compliance with the signals S1, S2, S3 and S4 through the cassette transporting apparatus 105 controlled by the transport control portion 114. In this operation, the positional control for stopping the cassette transporting apparatus 105 at the correct position in relation to the designated recording and/or reproducing apparatus 108 is carried out as follows.

On the memory 127 contained in the microcomputer 122 in the transport control portion 114, preset loading/unloading positions in relation to the recording and/or reproducing apparatus 108 where the cassette transporting apparatus 105 should stop are memorized in the form of data corresponding to the number of the pulses CO required for driving the stepping motor 107 to move the cassette transporting apparatus 105 to each preset loading/unloading position from the reference position C. However, the positions where the cassette transporting apparatus 105 should stop actually may be varied by, for example, the movement of the recording and/or reproducing apparatus 108. Accordingly, first, the stepping motor 107 is driven by, for example, the positive pulses CO obtained from the pulse generating circuit 125 in compliance with the data memorized on the memory 127 so as to move the cassette transporting apparatus 105 downward from the reference position C corresponding to the first recording and/or reproducing apparatus 108 (108a) to the preset loading/unloading position corresponding to the second recording and/or reproducing apparatus 108. At this time, in the microcomputer 122, the signal CO' corresponding to the pulses CO from the pulse generating circuit, 125 is counted by the counter 126. Since the photosensor 111 and the shutter 112 are arranged in size and relation of mutual position as described above, the photosensor 111 and the shutter 112 have one of three mutual positional relations as shown in FIGS. 13A, 13B and 13C when the cassette transporting apparatus 105 stops for the second recording and/or reproducing apparatus 108.

Figure 13A:
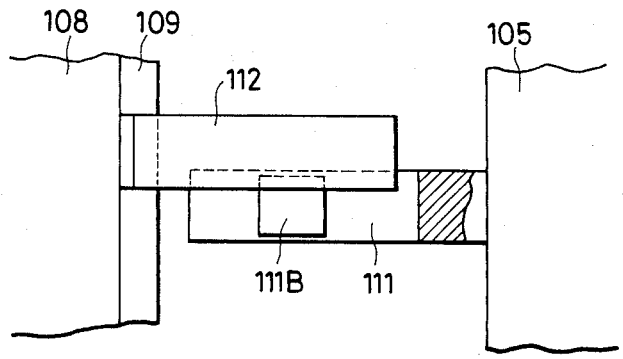
FIGS. 13A, 13B and 13C are schematic illustrations use for explanation of the positional relations between the recording and/or reproducing apparatus and the cassette transporting apparatus employed in the embodiment shown FIG.. 1.
Figure 13B:
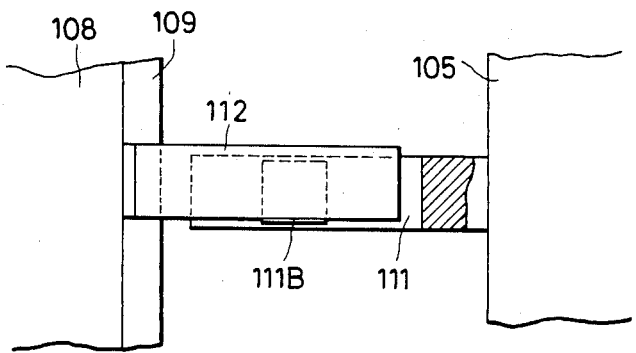
Figure 13C:
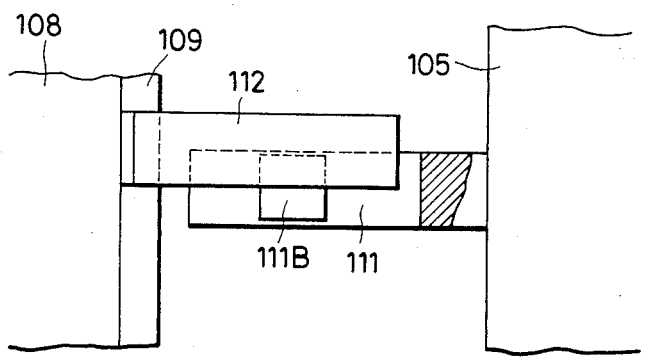

In the case of FIG. 13A, the lower end of the shutter 112 is higher than the center of the photodetecting element 111B of the photosensor 111 and, on the contrary, in the case of FIG. 13B, the lower end of the shutter 112 is lower than the center of the photodetecting element 111B of the photosensor 111. Meanwhile, in the case of FIG. 13C, the lower end of the shutter 112 is coincident with the center of the photodetecting element 111B of the photosensor 111. The cassette transporting apparatus 105 is located at the correct stop position in relation to the second recording and/or reproducing apparatus 108 in the case of FIG. 13C and, in the case of FIG. 13A or 13B, the stop position of the cassette transporting apparatus 105 is too low or too high and should be corrected to be the same as that in the case of FIG. 13C.

When the stop position of the cassette transporting apparatus 105 is too low as shown in FIG. 13A, the microcomputer 122 detects such a low stop position on the strength of the signal S3' supplied to the level discrimination circuit 123 with the high level and produces the negative pulses CO from the pulse generating circuit 125. With the negative pulses CO thus produced, the stepping motor 107 is driven to cause the cassette transporting apparatus 105 to ascend. Then, when the cassette transporting apparatus 105 is raised so that the center of the photodetecting element 111B is higher than the lower end of the shutter 112, the microcomputer 122 produces the positive pulses CO from the pulse generating circuit 125. With the positive pulses CO, the stepping motor 107 is driven to cause the cassette transporting apparatus 105 to descend. Then, when the level of the signal S3' supplied to the level discrimination circuit 123 is changed into high from low, the microcomputer 122 ceases to produce the pulses CO, so that the cassette transporting apparatus 105 stops at the correct stop position as shown in FIG. 13C.

During this positional control for the cassette transporting apparatus 105, the counter 126 conducts the down and up-counting in response to the signal CO' corresponding to the negative and positive pulses CO and the result of the counting obtained from the counter 126 is supplied to the memory 127 to renew thereby the data memorized on the memory 127. Consequently, the preset loading/unloading position for the second recording and/or reproducing apparatus 108 is corrected on the memory 127.

On the other hand, when the stop position of the cassette transporting apparatus 105 is too high as shown in FIG. 13B, the microcomputer 122 detects such a high stop position on the strength of the signal S3' supplied to the level discrimination circuit 123 with the low level and produces the positive pulses CO from the pulse generating circuit 125. With the positive pulses CO thus produced, the stepping motor 107 is driven to cause the cassette transporting apparatus 105 to descend further. Then, when the level of the signal S3' supplied to the level discrimination circuit 123 is changed into high from low, the microcomputer 122 ceases to produce the pulses CO, so that the cassette transporting apparatus 105 stops at the correct stop position as shown in FIG. 13C.

During this positional control for the cassette transporting apparatus 105 also, the counter 126 conducts the up-counting in response to the signal CO' corresponding to the positive pulses CO and the result of the counting obtained from the counter 126 is supplied to the memory 127 to renew thereby the data memorized on the memory 127. Consequently, the preset loading-/unloading position for the second recording and/or reproducing apparatus 108 is corrected on the memory 127.

After the correction of the preset loading/unloading position for the second recording and/or reproducing apparatus 108 on the memory 127 has been carried out as aforementioned, the preset loading/unloading positions for other recording and/or reproducing apparatus 108 on the memory 127 are corrected successively in the same manner as mentioned above. Then, after the correction of the preset loading/unloading positions for the whole recording and/or reproducing apparatus 108 on the memory 127 has been done, the cassette transporting apparatus 105 is controlled to move and stop to the recording and/or reproducing apparatus 108 in compliance with the preset loading/unloading positions memorized on the memory 127 in the microcomputer 122 in order to transport the tape cassette 102 to the designated recording and/or reproducing apparatus 108 from the cassette storing apparatus 101 and vice versa.

Figure 14:
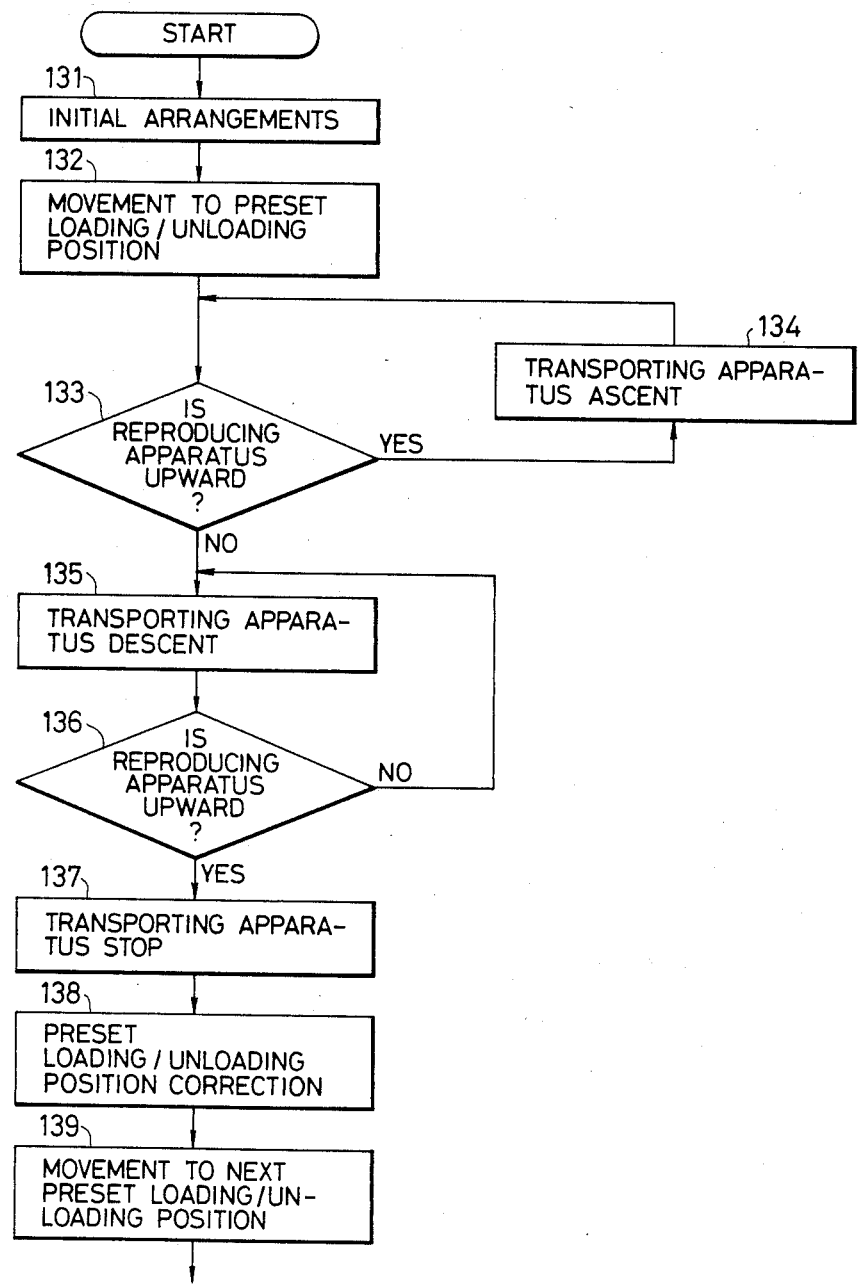
FIG. 14 is a flow chart used for explaining the operation of the controlling means shown in FIG. 12.

One example of the program functioning in the microcomputer 122 for the aforementioned positional control of the cassette transporting apparatus 105 will be explained with reference to the flow chart shown in FIG. 14 hereinafter.

After starting, in process 131, the initial arrangements are carried out. In the initial arrangements, the position of the cassette transporting apparatus 105 is set so that the lower end of the shutter 112 (112a) attached to the place coresponding to the first recording and/or reproducing apparatus 108 (108a), that is, the reference position C is coincident with the center of the photodetecting element 111B of the photosensor 111 attached to the cassette transporting apparatus 105. Further, the counter 126 is reset in the initial arrangements.

Next, in process 132, the stepping motor 107 is driven in response to the pulses CO which are obtained in compliance with the data of the preset loading/unloading position for the second recording and/or reproducing apparatus 108 read from the memory 127 to move the cassette transporting apparatus 105 to the preset loading/unloading position for the second recording and/or reproducing apparatus 108. Then, in decision 133, it is checked whether the position of the second recording and/or reproducing apparatus 108 is upward of the stop position appropriate actually for the second recording and/or reproducing apparatus 108 or not, on the strength of the level of the signal S3, when the cassette transporting apparatus 105 is stopped. If the position of the second recording and/or reproducing apparatus 108 is higher than the stop position appropriate actually for the second recording and/or reproducing apparatus 108, the cassette transporting apparatus 105 is raised by one step of movement in process 134, then the step is returned to the decision 133 so that the check in the decision 133 and the ascending movement of the cassette transporting apparatus 105 in the process 134 are repeated, until the center of the photodetecting element 111B exceeds the lower end of the shutter 112 disposed at the place corresponding to the second recording and/or reproducing apparatus 108.

When the center of the photodetecting element 111B has been moved to be under the lower end of the shutter 112 provided for the second recording and/or reproducing apparatus 108 or the position of the second recording and/or reproducing apparatus 108 is not higher than the stop position appropriate actually for the second recording and/or reproducing apparatus 108 originally, the cassette transporting apparatus 105 is lowered by one step of movement in process 135, then it is checked again whether or not the position of the second recording and/or reproducing apparatus 108 is upward of the stop position appropriate actually for the second recording and/or reproducing apparatus 108. In the case where the position of the second recording and/or reproducing apparatus 108 is not higher than the stop position appropriate actually for the second recording and/or reproducing apparatus 108, the step is returned to the process 135 so that the cassette transporting apparatus 105 is further lowered by one step of movement. The descending movement of the cassette transporting apparatus 105 in the process 135 and the check in the decision 136 are repeated.

After that, when it is judged that the position of the second recording and/or reproducing apparatus 108 has moved to be higher than the stop position appropriate actually for the second recording and/or reproducing apparatus 108 in the decision 136, the cassette transporting apparatus 105 is stopped in process 137. At this time, the cassette transporting apparatus 105 is located at the correct stop position where, the center of the photodetecting element 111B of the photosensor 111 is coincident with the shutter 112 provided for the second recording and/or reproducing apparatus 108. Then, in process 138, the result of the counting obtained from the counter 126 on that occasion is supplied to the memory 127 to renew thereby the date memorized on the memory 127, so that the preset loading/unloading position for the second recording and/or reproducing apparatus 108 is corrected on the memory 127.

The correction of the preset loading/unloading position for the second recording and/or reproducing apparatus 108 on the memory 127 has been carried out in the manner aforementioned, and the step is advanced to process 139. In the process 139, the cassette transporting apparatus 105 is moved to the next preset loading- /unloading position, that is, the preset loading/unloading position for the third recording and/or reproducing apparatus 108 in order to correct the same on the memory 127 in the same manner as described above in connection with the second recording and/or reproducing apparatus 108, and thereafter, the correction of the preset loading/unloading position for the rest of the recording and/or reproducing apparatus 108 is successively carried out.

As apparent from the above, this example of the cassette transporting apparatus 105 can be moved to and stopped automatically and accurately at the stop position appropriate for transferring the tape cassette 102 to the designated recording and/or reproducing apparatus 108 from the cassette storing apparatus 101, or vice versa, even though the position of each recording and/or reproducing apparatus 108 shifts with the lapse of time. Accordingly, in the signal recording and/or reproducing system according to the present invention employing the aforementioned example of the cassette transporting apparatus 105, the transfer of the tape cassette 102 to the recording and/or reproducing apparatus 108 from the cassette storing apparatus 101 and vice versa is carried out smoothly and efficiently without causing such a trouble that the entire system is hindered from working properly.

What is claimed is:

1. A signal recording and/or reporducing system having a tape cassette storing and transporting arrangement therein, comprising:

cassette storing means comprising a plurality of receiving compartments each provided for receiving a tape cassette to store the same therein, a plurality of recording and/or reproducing means for recording an information signal on or reproducing an information signal from the tape cassette taken out selectively from said cassette storing means, each of said recording and/or reproducing means comprising a housing which is provided with a control panel and with an opening through which the tape cassette is inserted therein and a cassette loading mechanism provided in said housing for placing the tape cassette inserted in the housing through said opening in a tape drive portion provided in said housing, cassette transporting means cooperating with said cassette storing means and said recording and/or reproducing means for taking the tape cassette out of a selected one of the receiving compartments of said cassette storing means and transporting the tape cassette taken out from said cassette storing means in order to transfer the same to a selected one of said recording and/or reproducing means through said opening and to the receiving compartment of said cassette storing means from said selected one of said recording and/or reproducing means, transportation driving means connected to said cassette transporting means for moving said cassette transporting means along the arrangement of said plurality of recording and/or reproducing means, position detecting means associated with said cassette transporting means for detecting the position of said cassette transporting means in relation to positions where said cassette transporting means should stop to transfer the tape cassette to said selected one of said recording and/or reproducing means and producing an output signal representing the detected position, and electronic controlling means connected to said transportation driving means for controlling said transportation driving means for cause said cassette transporting means initially to move towards a previously memorized stop position and then to move to and stop at to current appropriate stop position determined in accordance with the current output signal of said position detecting means, said electronic controlling means comprising means for memorizing said current appropriate stop position as a corrected preset stop position for subsequent use to control the initial movement of said cassette transporting means.

2. A signal recording and/or reproducing system according to claim 1, wherein said cassette loading mechanism provided in said selected one of said recording and/or reproducing means comprises a cassette chamber for receiving the tape cassette inserted in the housing through said opening an dsecuring the same therein, and chamber driving means connected to said cassette chamber for moving said cassette chamber to load the tape cassette received thereby on said tape driving portion.

3. A signal recording and/or reproducing system according to claim 2, wherein said chamber driving means provided in said selected one of said recording and/or reproducing means is disposed to face a given side portion of the tape cassette received by said cassette chamber, said given side portion being opposite to another side portion of said tape cassette where a lid is movably provided for covering a side opening from which a tape is drawn out.

4. A signal recording and/or reproducing system according to claim 1, wherein a plurality of said recording and/or reproducing means are provided to be arranged in order.

5. A signal recording and/or reproducing system according to claim 1, wherein said cassette storing means further comprises cassette registering means associated with said tape cassettes for making the registration of the tape cassettes stored in said receiving compartments, respectively.

6. A signal recording and/or reproducing system according to claim 5, wherein said cassette registering means comprises cassette detecting means associated with said receiving compartments for detecting the tape cassette stored in said receiving compartments and producing an output signal in response to the existence of the tape cassette in said receiving compartments, and memory means for memorizing the information specifying each tape cassette detected by said cassette detecting means and one of said receiving compartments in which said tape cassette detected by said cassette detecting means is stored in response to the output signal of said cassette detecting means.

* * * * *

UNITED STATES PATENT AND TRADEMARK OFFICE
CERTIFICATE OF CORRECTION

PATENT NO. : 4,731,682
DATED : March 15, 1988
INVENTOR(S) : Hiraku Nishiyama et al.

It is certified that error appears in the above-identified patent and that said Letters Patent is hereby corrected as shown below:

In the abstract, line 11, change "cassete" to --cassette--.

Column 2, line 25, delete "for";

line 32, change "check" to --inspection--.

Column 3, line 18, delete ",".

Column 15, line 15, after "the" delete "/".

Column 16, line 21, after "circuit" delete --,--.

Column 18, line 53, after "where" delete --,--.

IN THE CLAIMS

Column 20, line 9, change "for" to --to--.

Signed and Sealed this

Twenty-seventh Day of December, 1988

Attest:

DONALD J. QUIGG

Attesting Officer    Commissioner of Patents and Trademarks